(12) United States Patent
Gaito et al.

(10) Patent No.: US 12,549,611 B2
(45) Date of Patent: Feb. 10, 2026

(54) TRANSMISSION OF LAWFUL INTERCEPTION INFORMATION BY A NETWORK ELEMENT

(71) Applicant: Telefonaktiebolaget LM Ericsson (publ), Stockholm (SE)

(72) Inventors: Daniele Gaito, Naples (IT); Gaetano Barba, Sant'Antonio Abate (IT); Raffaele Costabile, Torre del Greco (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 160 days.

(21) Appl. No.: 18/288,348

(22) PCT Filed: Apr. 27, 2021

(86) PCT No.: PCT/EP2021/061015
§ 371 (c)(1),
(2) Date: Oct. 25, 2023

(87) PCT Pub. No.: WO2022/228660
PCT Pub. Date: Nov. 3, 2022

(65) Prior Publication Data
US 2024/0214430 A1    Jun. 27, 2024

(51) Int. Cl.
*H04L 9/40* (2022.01)
*H04L 43/062* (2022.01)

(52) U.S. Cl.
CPC ............ *H04L 63/30* (2013.01); *H04L 43/062* (2013.01)

(58) Field of Classification Search
CPC ....... H04L 63/30; H04L 43/062; H04W 12/80
See application file for complete search history.

(56) References Cited

U.S. PATENT DOCUMENTS

2008/0198993 A1* 8/2008 Imbimbo ............ H04M 3/2281
379/213.01
2011/0283011 A1* 11/2011 Li ........................... H04L 12/14
709/231

(Continued)

OTHER PUBLICATIONS

European Telecommunications Standards Institute (ETS): "Lawful Interception (LI); Internal Network Interfaces; Part 1: X1" ETSI Technical Specification TS 103 221-1 V1.8.1 (Year: 2021).*

(Continued)

*Primary Examiner* — Anh Nguyen
(74) *Attorney, Agent, or Firm* — Rothwell, Figg, Ernst & Manbeck, P.C.

(57) ABSTRACT

A lawful interception administrative function (ADMF) transmits (201) to a network element (NE) via an XI interface, a request for information pertaining to LI tasks that are associated with the NE. The request comprises a bulk indicator that indicates a procedure of transmission, from the NE to the ADMF, of said information pertaining to LI tasks. The NE determines (203), based at least on the bulk indicator, whether or not transmission of said information pertaining to LI tasks is to be performed using the procedure of transmission indicated by the bulk indicator. If it is determined that transmission of said information pertaining to LI tasks is to be performed using the procedure of transmission indicated by the bulk indicator, the NE transmits (205), to the ADMF via the X1 interface using the procedure of transmission indicated by the bulk indicator, said information pertaining to LI tasks.

12 Claims, 7 Drawing Sheets

(56) References Cited

U.S. PATENT DOCUMENTS

2012/0089747 A1* 4/2012 Attanasio ............... H04L 63/30
                                                    709/246
2018/0287924 A1  10/2018 Ghosh et al.
2021/0067955 A1*  3/2021 Rao ...................... H04L 63/306

OTHER PUBLICATIONS

International Search Report and Written Opinion issued in International Application No. PCT/EP2021/061015 Oct. 12, 2021 (12 pages).
ETSI TS 103 221-1 V1.8.1 (Apr. 2021). Technical Specification, Lawful Interception (LI); Internal Network Interfaces; Part 1: X1, Apr. 2021 (44 pages).
ETSI TS 133 107 V16.0.0 (Aug. 2020), Technical Specification, Universal Mobile Telecommunications System (UMTS); LTE; Digital cellular telecommunications system (Phase 2+) (GSM); 3G security; Lawful interception architecture and functions (3GPP TS 33.107 version 16.0.0 Release 16), Aug. 2020 (406 pages).
Leach, P. et al.,"A Universally Unique IDentifier (UUID) URN Namespace", DataPower Technology, Inc., Jul. 2005 (32 pages).

* cited by examiner

TRANSMISSION OF LAWFUL INTERCEPTION INFORMATION BY A NETWORK ELEMENT

CROSS REFERENCE TO RELATED APPLICATIONS

This application is a 35 U.S.C. § 371 National Stage of International Patent Application No. PCT/EP2021/061015, filed 2021 Apr. 27.

TECHNICAL FIELD

Embodiments herein relate to a method performed by a computer system in a telecommunication network, said computer system hosting at least a lawful interception (LI) administrative function (ADMF) and a network element (NE), corresponding computer systems as well as computer programs and carriers of such computer programs.

BACKGROUND

Lawful interception of traffic between communicating entities in a telecommunication network involves interaction between several functions in a core network that is part of the telecommunication network. For the purpose of the present disclosure, it is enough to mention an LI ADMF and a NE. As will be exemplified further in the detailed description below, an NE in the present context is an entity in the core network that is involved in the communication activity that is subject to LI.

Communication between entities in the core network, in a LI context, is subject to various standards in the form of technical specifications (TS) set by the European Telecommunications Standards Institute (ETSI). According to ETSI TS 103 221-1 (current version V1.8.1), the ADMF and the NE exchange messages between them on an X1 interface. The direction of the messages can be from the ADMF to the NE or vice versa, the first message in an exchange of messages being defined as a request message and a following message in the opposite direction being defined as a response message.

The exchanged messages can be one of several types of messages. Definition messages that are requests from the ADMF to the NE are used for starting, modifying and stopping tasks as well as for creating, modifying and removing destinations. Messages for getting information from the NE that are requests from the ADMF to the NE are used for getting information about a task, getting information about a destination, getting information about the NE status, getting information about all tasks, destinations and the NE status, and listing all tasks and destinations. Messages for reporting issues from the NE that are requests from the NE to the ADMF are used for reporting a task issue, reporting a destination issue and reporting an NE issue. A ping message is a connection testing message that is a request from either the NE to the ADMF or from the ADMF to the NE. Another connection testing message is a keepalive request from the ADMF to the NE.

In an exchange of messages, a response to a request shall be sent without undue delay and shall be sent within a time period TIME1 of receiving the request. The requester will wait a time period TIME2 (greater than TIME1) for a response and having not received a response within the time period TIME2, the request is considered without response, i.e. a timeout condition has occurred. Connection testing messages do not require any work by the receiver, which means that, if there are no connection problems, a connection testing request can be responded to immediately, without any timeout problem. Reporting issue from the NE messages may require work by the ADMF, but the response to send to the NE is only an acknowledgement (ACK) of the message reception, which means that it can be sent back by the ADMF to the NE immediately, without any timeout problem.

Definition messages and getting information from NE messages require some actions to perform by the NE and the response messages to the ADMF include the results of these actions, which means that it is possible that the NE cannot complete the requested actions within the time period TIME1. In case a definition message requires a longer time period than TIME1 to be completed, it is foreseen in the ETSI standard that, instead of an "OK—Acknowledged and Completed" response, an "OK—Acknowledged" response is sent back to the ADMF that means that the request has been received by the NE but it has not yet been completed by the NE. As soon as the requested action has been completed by the NE, a reporting issue from the NE message (task or destination issue) shall be sent to the ADMF to inform the ADMF about the final status (completed or unsuccessful) of the request.

Currently, the ETSI standard does not include a specification of any mechanism to allow the correct handling of getting information from NE messages for reporting a large amount of data that could cause timeout and transmission problems. For example, the number of tasks that are handled by an NE can be very high and creating a message response including information for all tasks can require a long time and generate a large amount of data to send in a response, causing timeout problems as well as causing congestion on a channel carrying an X1 interface. In case the ADMF applies a retry mechanism, after a timeout period has lapsed, the risk of creating a "loop" is high with an associated drawback that the X1 channel and the NE become congested.

SUMMARY

In view of the above, an object of the present disclosure is to overcome drawbacks related to transmission of task related information from an NE to an ADMF. This object is achieved in a first aspect by a method performed by a computer system in a telecommunication network, the computer system hosting at least an LI ADMF and an NE.

The method of the first aspect comprises transmitting, by the ADMF to the NE via an X1 interface, a request for information pertaining to LI tasks that are associated with the NE. The request comprises a bulk indicator that indicates a procedure of transmission, from the NE to the ADMF, of said information pertaining to LI tasks. The NE determines, based at least on the bulk indicator, whether or not transmission of said information pertaining to LI tasks is to be performed using the procedure of transmission indicated by the bulk indicator. If it is determined that transmission of said information pertaining to LI tasks is to be performed using the procedure of transmission indicated by the bulk indicator, the NE transmits, to the ADMF via the X1 interface using the procedure of transmission indicated by the bulk indicator, said information pertaining to LI tasks.

In other words, a request from the ADMF to the NE of information pertaining to LI tasks that the NE is associated with is provided with a new indicator. This new indicator, i.e. the bulk indicator, specifies for the NE to apply an indicated transmission procedure when providing the requested information to the ADMF. This is advantageous in that it enables the ADMF and the NE to perform an exchange of messages for providing a large amount of task information from the NE to the ADMF without risking a timeout or risking a congestion of a channel carrying the X1 interface between the ADMF and the NE. That is, the expression "bulk" indicator is used in order to accentuate that a distinct mass or portion of entities, especially a large mass or portion of information, is handled by the method.

Such advantages are further accentuated in cases where the bulk indicator indicates that the information pertaining to LI tasks is to be kept in one bulk or split into several bulks of information for transmission by the NE to the ADMF via the X1 interface using a corresponding one or several transmissions.

The bulk indicator may have a first value, in which cases the determining by the NE comprises determining that said information pertaining to LI tasks is to be kept in one bulk or split into several bulks of information for transmission by the NE.

In such cases, the NE may determine a number of bulks of information for transmission of said information pertaining to LI tasks. The transmitting by the NE 107 to the ADMF via the X1 interface may then comprise transmitting a response comprising a confirmation that subsequent transmissions will comprise a respective bulk of information from said information pertaining to LI tasks, transmitting zero or more requests comprising a respective bulk of information from said information pertaining to LI tasks and comprising a confirmation that at least one further bulk of information from said information pertaining to LI tasks will be transmitted, and transmitting a request comprising a last bulk of information from said information pertaining to LI tasks and comprising a confirmation that a last bulk of information from said information pertaining to LI tasks has been transmitted.

The bulk indicator may have a second value, in which cases the determining by the NE comprises determining that said information pertaining to LI tasks is to be kept in one bulk or split into several bulks of information for transmission by the NE.

In such cases, the NE determines that a number of bulks of information for transmission of said information pertaining to LI tasks is one, and the transmitting by the NE to the ADMF via the interface may comprise transmitting a response comprising one bulk of information from said information pertaining to LI tasks and comprising a confirmation that a last bulk of information from said information pertaining to LI tasks has been transmitted. In other cases, the NE may determine a number of bulks of information for transmission of said information pertaining to LI tasks. The transmitting by the NE to the ADMF via the X1 interface may then comprise transmitting a response comprising a first bulk of information from said information pertaining to LI tasks and comprising a confirmation that at least one further bulk of information from said information pertaining to LI tasks will be transmitted, transmitting zero or more requests comprising a respective bulk of information from said information pertaining to LI tasks and comprising a confirmation that at least one further bulk of information from said information pertaining to LI tasks will be transmitted, and transmitting a request comprising a last bulk of information from said information pertaining to LI tasks and comprising a confirmation that a last bulk of information from said information pertaining to LI tasks has been transmitted.

The bulk indicator may have a third value, in which cases the determining by the NE comprises determining that said information pertaining to LI tasks is to be kept in one bulk of information for transmission by the NE. Such cases further comprise transmitting, by the NE to the ADMF via the X1 interface, a response comprising one bulk of information from said information pertaining to LI tasks and comprising a confirmation that a last bulk of information from said information pertaining to LI tasks has been transmitted.

Furthermore, the transmitting of a request by the ADMF to the NE via the X1 interface may comprise transmitting any of a GetAllDetailsRequest message and a ListAllDetailsRequest message as specified in technical specification 103 221-1 V1.8.1 by the ETSI.

Similarly, any transmitting of a response by the NE to the ADMF via the X1 interface may comprise transmitting any of a GetAllDetailsResponse message and a ListAllDetailsResponse message as specified in technical specification 103 221-1 V1.8.1 by the ETSI.

Also, any transmitting of a request by the NE to the ADMF via the X1 interface may comprise transmitting a BulkAllDetailsRequest message as specified in technical specification 103 221-1 V1.8.1 by the ETSI.

In other words, such a BulkAllDetailsRequest message is a new message introduced as a consequence of the need for overcoming the drawbacks of prior art standard as defined in technical specification 103 221-1 V1.8.1 by the ETSI. Needless to say, such an addition of a new message to technical specification 103 221-1 V1.8.1 may involve naming the message differently, remembering that the essence of adding a new message is that of further enhancing the method of transmitting large amounts of data from the NE to the ADMF.

In a further aspect, there is provided a computer system comprising a processor and a memory, said memory containing instructions executable by said processor whereby said computer system is operative to perform a method as summarized above.

In yet a further aspect, there is provided a computer program comprising instructions which, when executed on at least one processor in a computer system, cause the computer system to carry out a method as summarized above.

In yet a further aspect, there is provided a carrier, comprising the computer program as summarized above, wherein the carrier is one of an electronic signal, an optical signal, a radio signal and a computer readable storage medium.

These further aspects and embodiments of these further aspects provide the same effects and advantages as summarized above in connection with the method of the first aspect.

DETAILED DESCRIPTION

Figure 1A:
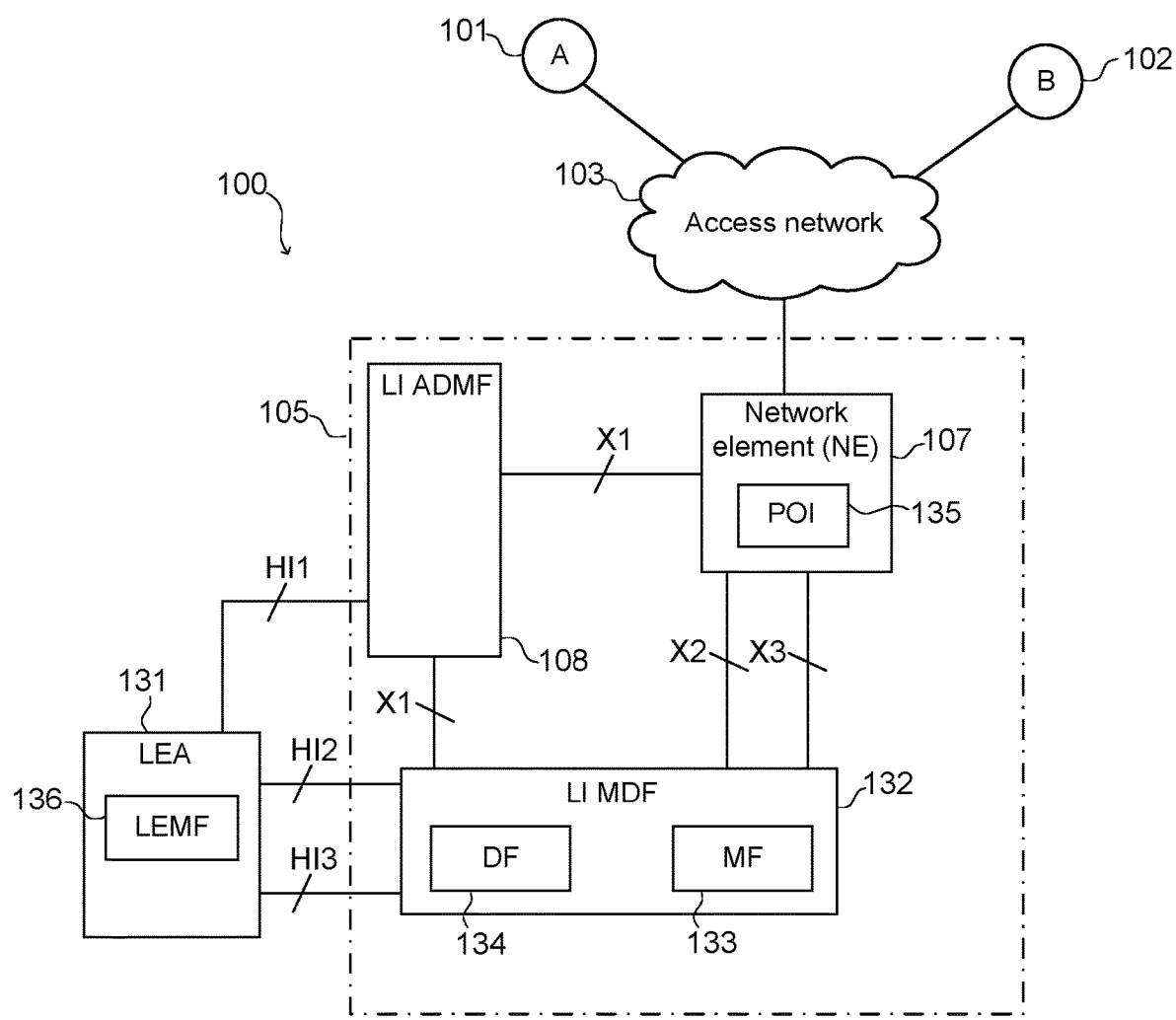
FIGS. 1a-b are schematically illustrated block diagrams of LI systems.

FIG. 1a schematically illustrates a first functional representation of a telecommunication network 100 comprising a core network 105 and an access network 103 in which two communicating entities, a first communicating entity 101 and a second communicating entity 102 are connected. The access network may, e.g., be in the form of a 3GPP radio access network (RAN) or any other type of non-3GPP communication network that may connect to the core network 105, which may be e.g. an Evolved Packet Core (EPC), a 5G core network (5GC) or any future core network in which the skilled person would understand that the methods and arrangements described herein can be implemented in.

As the skilled person will realize, communication performed by the first and second communicating entities 101, 102 is enabled by several functional units in both the access network 103 and the core network 105. For the sake of clarity of description, such functional units are not illustrated in full but only schematically represented and exemplified by a network element (NE) 107 that, in a 4G context (e.g. 3GPP Evolved Packet System (EPS), may be a mobility management entity (MME), a serving gateway (S-GW), a packet data network gateway (P-GW) etc. In a 5G context, the network element 107 may, e.g., be in the form of a policy control function (PCF), a user data management function (UDM), an Access and Mobility Management Function (AMF) or a session management function (SMF) etc. The network element may even be an SMS-Function (SMSF).

A common characteristic of such functional units, as represented by network element 107, in the core network 105 is that they may comprise LI functionality in the form of a point of interception (POI) 135. The POI 135 is in FIG. 1a thus depicted as being a part of the network element 107 or being embedded therein, but the POI 135 may also be separate from the network element 107 with which it is associated. The core network 105 may be the core network of a serving network (SN), which may be a Visited Public Land Mobile Network (VPLMN) or a Home Public Land Mobile Network (HPLMN).

The core network 105 also comprises an administrative function (ADMF) 108 (also called LI ADMF) and a mediation and delivery function (MDF) 132 that connects to a law enforcement agency (LEA) 131. Within the MDF 132 a mediation function (MF) 133 and a delivery function (DF) 134 are configured to handle an intercept product in the form of intercept related information (IRI) and content of communication (CC) received from the POI 135 and provide the IRI and CC to the LEA 131. The LEA 131 manages a LEA communication device in the form of a law enforcement monitoring facility (LEMF) 136, which receives IRI and CC from the DF 134.

Communication between the entities in the telecommunication system 100 takes place via X1, X2, X3, and HI1, HI2 and HI3 interfaces. That is, the ADMF 108 communicates with the MF 133, DF 134, the POI 135 and the NE 107 via the X1 interface. The POI 135 in the NE 107 communicates with the MF 133 via the X2 and X3 interfaces. The ADMF 108 also communicates with the LEA 131 via an HI1 interface, and the DF 134 communicates with the LEMF 136 in the LEA 131 via HI2 and HI3 interfaces.

Figure 1B:
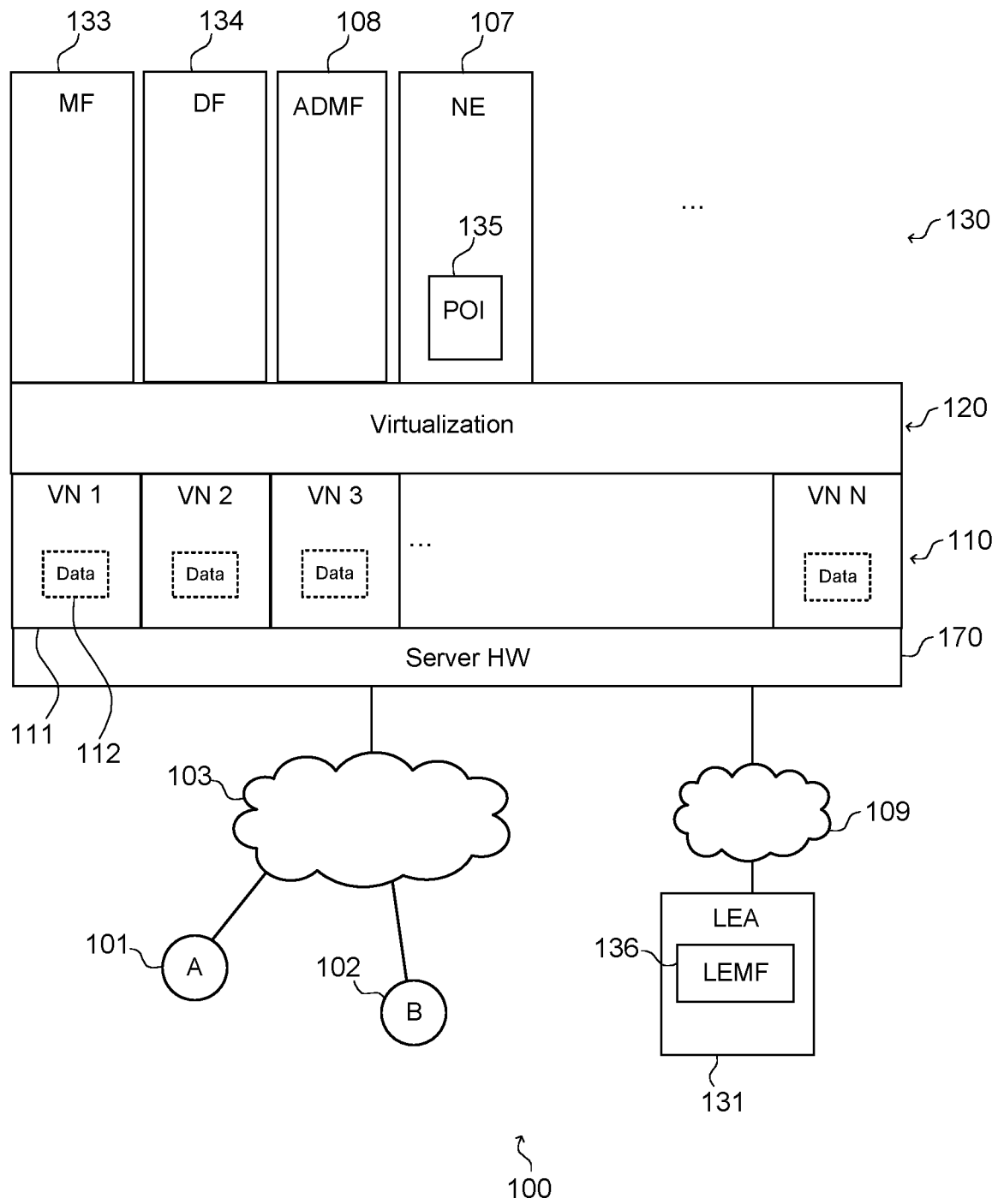

FIG. 1b schematically illustrates the telecommunication network 100 as it is realized using hardware wherein virtual network functions (VNF) are executed on virtual nodes 110 that utilize a hardware server platform 170. The MF 133, the DF 134, the ADMF 108, the NE 107 and the POI 135 are realized in a functional layer 130 of VNFs that execute in the virtual nodes 110 via a virtualization layer 120. For example, a virtual node 111 is a collection of software instructions as well as associated data 112 as the skilled person will realize. The LEA 131 with its LEMF 136 is connected to the hardware platform 170 via an intermediate network 109, the details of which are outside the scope of the present disclosure. Although not explicitly illustrated in FIG. 1b, communication between entities via the X1, X2, X3, HI1, HI2 and HI3 interfaces take place as described above in connection with FIG. 1a.

Turning now to the flowcharts illustrated in FIGS. 2a-e and the signalling diagrams illustrated in FIGS. 3a-e, and with continued reference to FIGS. 1a-b, embodiments of methods in the telecommunication network 100 will be described in some more detail. The embodiments will exemplify how the various functional units and the X1 interface described above may be enhanced in order to provide the effect and advantages associated with transmission of task related information from a NE to an ADMF.

Figure 2A:
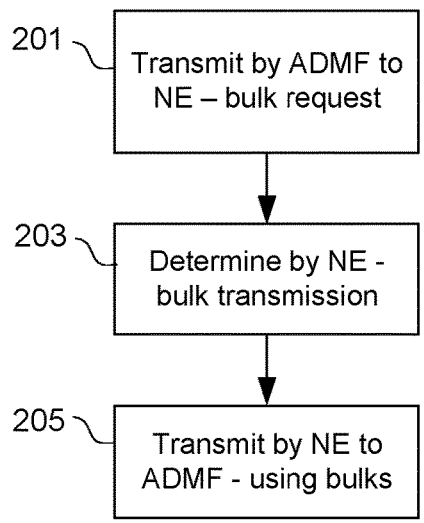
FIGS. 2a-e are flowcharts of methods.
Figure 3A:
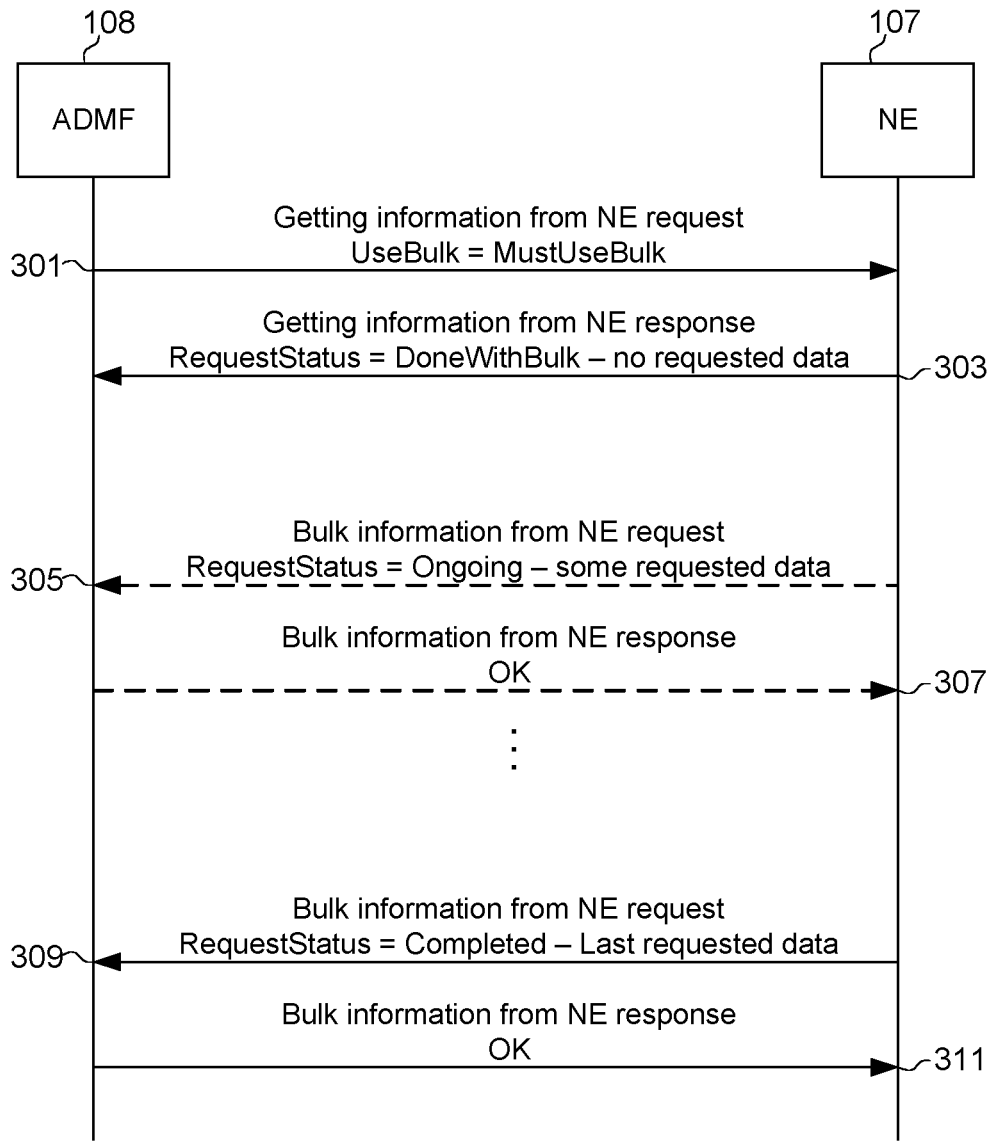
FIGS. 3a-e are signaling diagrams illustrating signals transmitted in the methods illustrated in FIGS. 2a-e,
FIG. 4 schematically illustrates a computer system, and
FIG. 5 schematically illustrates a computer system.

FIG. 2a and FIG. 3a illustrate a method that comprises actions performed by a computer system in a telecommunication network 100, said computer system hosting at least the ADMF 108 and the NE 107 introduced and described above in connection with FIGS. 1a-b:

Action 201

The ADMF 108 transmits, to the NE 107 via an X1 interface, a request 301 for information pertaining to LI tasks that are associated with the NE 107. The request comprises a bulk indicator that indicates a procedure of transmission, from the NE 107 to the ADMF 108, of said information pertaining to LI tasks.

In some embodiments, the bulk indicator indicates that the information pertaining to LI tasks is to be kept in one bulk or split into several bulks of information for transmission by the NE 107 to the ADMF 108 via the X1 interface using a corresponding one or several transmissions.

Action 203

The NE 107 determines, based at least on the bulk indicator, whether or not transmission of said information pertaining to LI tasks is to be performed using the procedure of transmission indicated by the bulk indicator.

Action 205

If it is determined, in action 203, that transmission of said information pertaining to LI tasks is to be performed using the procedure of transmission indicated by the bulk indicator, the NE 107 transmits, to the ADMF 108 via the X1 interface using the procedure of transmission indicated by the bulk indicator, said information pertaining to LI tasks.

In some embodiments, where the bulk indicator transmitted by the ADMF 108 in action 201 has a first value, the determining by the NE 107 in action 203 comprises determining that said information pertaining to LI tasks is to be kept in one bulk or split into several bulks of information for transmission by the NE 107.

Figure 2B:
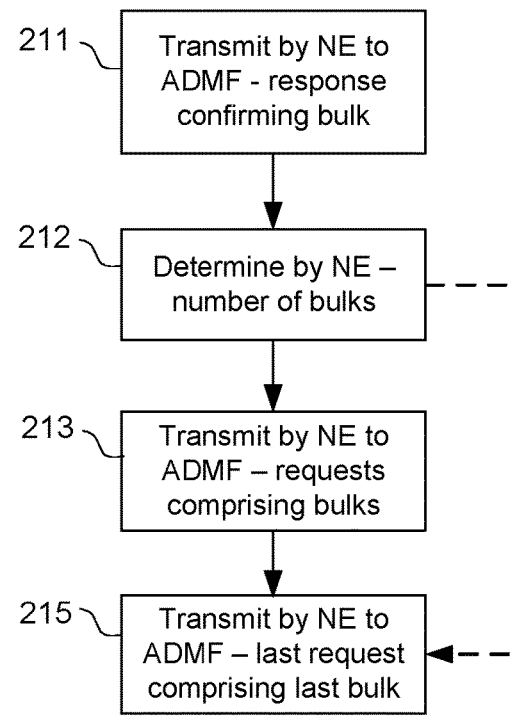

As illustrated in FIG. 2b, such embodiments may comprise an action 212 where the NE 107 determines a number of bulks of information for transmission of said information pertaining to LI tasks. In these embodiments, the transmitting by the NE 107 to the ADMF 108 via the X1 interface in action 205 may comprise the actions:

Action 211

The NE 107 transmits a response 303 comprising a confirmation that subsequent transmissions will comprise a respective bulk of information from said information pertaining to LI tasks.

Action 213

The NE 107 transmits zero or more requests 305 comprising a respective bulk of information from said information pertaining to LI tasks and comprising a confirmation that at least one further bulk of information from said information pertaining to LI tasks will be transmitted.

In other words, in the case that the NE 107 determines, in action 212, that the number of bulks of information for transmission is only one, then action 213 will not be performed.

Action 215

The NE 107 transmits a request 309 comprising a last bulk of information from said information pertaining to LI tasks and comprising a confirmation that a last bulk of information from said information pertaining to LI tasks has been transmitted.

In some embodiments, the transmitting of a request 301 by the ADMF 108 to the NE 107 via the X1 interface in action 201 comprises transmitting information specifying a maximum bulk size of a bulk of information for transmission from the NE 107 to the ADMF 108. In such embodiments, any transmitting in actions 213 and 215 of a request 305, 309 by the NE 107 to the ADMF 108 via the X1 interface comprising a bulk of information from said information pertaining to LI tasks comprises transmitting each respective bulk of information using a bulk size that is less than or equal to said maximum bulk size.

In some embodiments, the transmitting of a request 301 by the ADMF 108 to the NE 107 via the X1 interface in action 201 comprises transmitting information identifying the request transmitted by the ADMF 108. In such embodiments, any transmitting in actions 213 and 215 of a request 305, 309 by the NE 107 to the ADMF 108 via the X1 interface comprising a bulk of information from said information pertaining to LI tasks comprises transmitting the information identifying the request 301 transmitted from the ADMF 108.

In some embodiments, where the bulk indicator transmitted by the ADMF 108 in action 201 has a second value, the determining by the NE 107 in action 203 comprises determining that said information pertaining to LI tasks is to be kept in one bulk or split into several bulks of information for transmission by the NE 107.

Figure 2C:
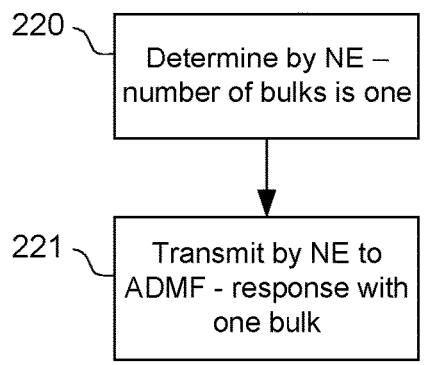
Figure 3B:
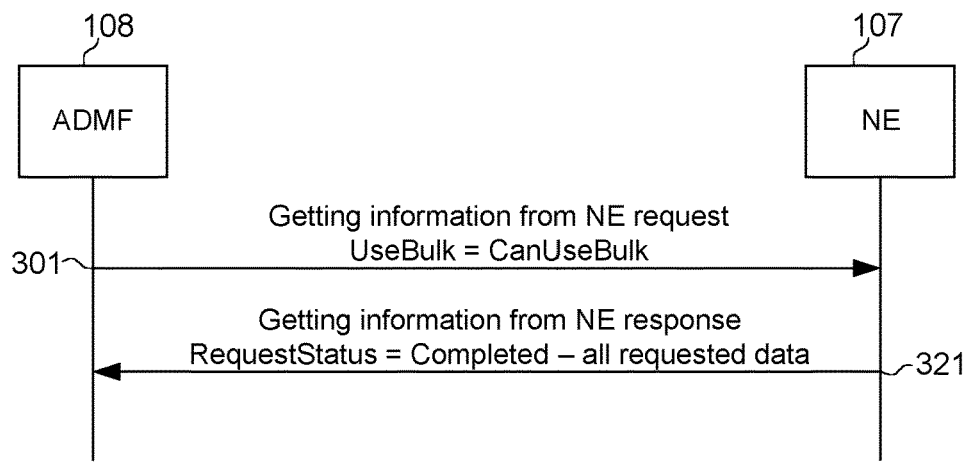

As illustrated in FIG. 2c and FIG. 3b, the NE 107 determines in an action 220 that the number of bulks of information for transmission of said information pertaining to LI tasks is one. In such embodiments the transmitting by the NE 107 in action 205 may comprise an action 221 where the NE 107 transmits a response 321 comprising one bulk of information from said information pertaining to LI tasks and comprising a confirmation that a last bulk of information from said information pertaining to LI tasks has been transmitted.

In some embodiments, the transmitting of a request 301 by the ADMF 108 to the NE 107 via the X1 interface in action 201 comprises transmitting information specifying a maximum bulk size of a bulk of information for transmission from the NE 107 to the ADMF 108. In such embodiments, the transmitting in action 221 of a response 321 by the NE 107 to the ADMF 108 via the X1 interface may comprise a bulk of information from said information pertaining to LI tasks comprises transmitting the one bulk of information using a bulk size that is less than or equal to said maximum bulk size.

Figure 2D:
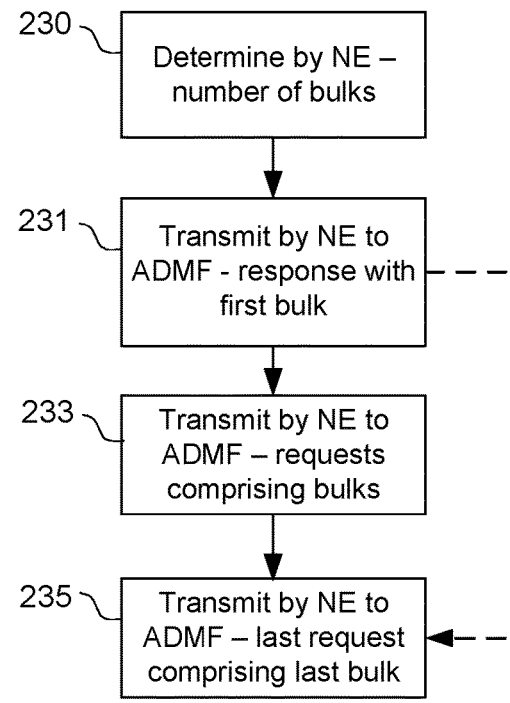
Figure 3C:
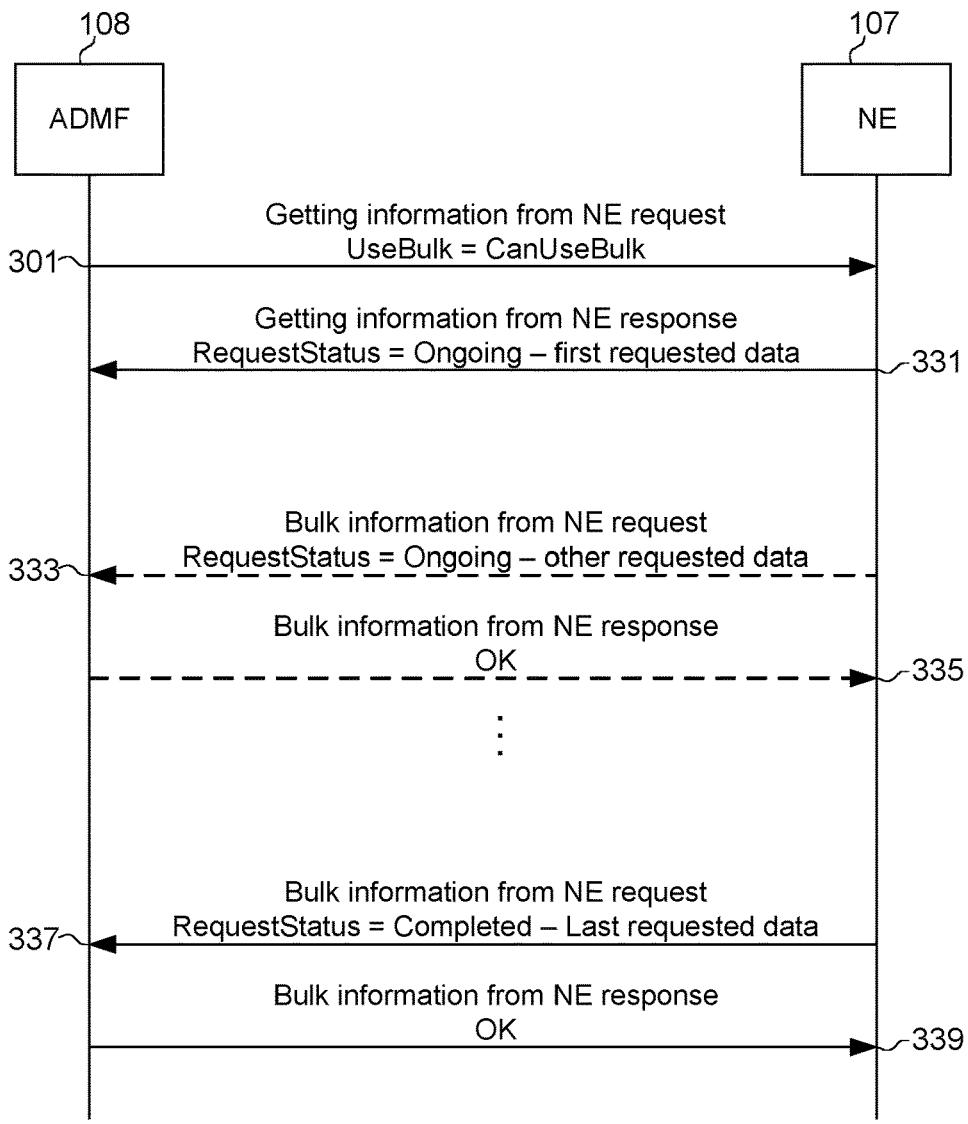

As illustrated in FIG. 2d and FIG. 3c and continuing with embodiments where the bulk indicator transmitted by the ADMF 108 in action 201 has a second value, some embodiments comprise an action 230 where the NE 107 determines a number of bulks of information for transmission of said information pertaining to LI tasks. In these embodiments, the transmitting by the NE 107 to the ADMF 108 via the X1 interface in action 205 may comprise the actions:

Action 231

The NE 107 transmits a response 331 comprising a first bulk of information from said information pertaining to LI tasks and comprising a confirmation that at least one further bulk of information from said information pertaining to LI tasks will be transmitted.

Action 233

The NE 107 transmits zero or more requests 333 comprising a respective bulk of information from said information pertaining to LI tasks and comprising a confirmation that at least one further bulk of information from said information pertaining to LI tasks will be transmitted.

In other words, in the case that the NE 107 determines, in action 230, that the number of bulks of information for transmission is only two, then action 233 will not be performed.

Action 235

The NE 107 transmits a request 337 comprising a last bulk of information from said information pertaining to LI tasks and comprising a confirmation that a last bulk of information from said information pertaining to LI tasks has been transmitted. It is to be noted that, in case all information pertaining to LI tasks has been already transmitted in action 233, the transmitting in action 235 will comprise only the confirmation that a last bulk of information from said information pertaining to LI tasks has been transmitted.

In some embodiments, the transmitting of a request 301 by the ADMF 108 to the NE 107 via the X1 interface in action 201 comprises transmitting information specifying a maximum bulk size of a bulk of information for transmission from the NE 107 to the ADMF 108. In such embodiments, the transmitting in action 231 of a response 331 by the NE 107 to the ADMF 108 via the X1 interface comprising a first bulk of information from said information pertaining to LI tasks comprises transmitting the first bulk of information using a bulk size that is less than or equal to said maximum bulk size. Also, in such embodiments, any transmitting in actions 233 and 235 of a request 333 by the NE 107 to the ADMF 108 via the X1 interface comprising a bulk of information from said information pertaining to LI tasks comprises transmitting each respective bulk of information using a bulk size that is less than or equal to said maximum bulk size.

In some embodiments, the transmitting of a request 301 by the ADMF 108 to the NE 107 via the X1 interface in action 201 comprises transmitting information identifying the request transmitted by the ADMF 108. In such embodiments, any transmitting in actions 233 and 235 of a request 333 by the NE 107 to the ADMF 108 via the X1 interface of a bulk of information from said information pertaining to LI tasks comprises transmitting the information identifying the request transmitted from the ADMF 108.

Figure 2E:
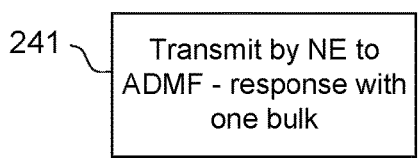
Figure 3D:
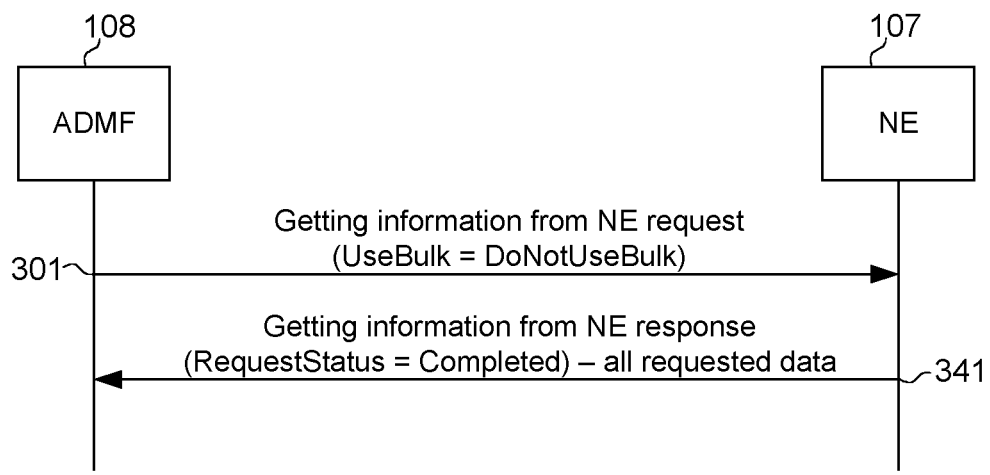

In some embodiments, where the bulk indicator transmitted by the ADMF 108 in action 201 has a third value, the determining by the NE 107 in action 203 comprises determining that said information pertaining to LI tasks is to be kept in one bulk of information for transmission by the NE 107. As illustrated in FIG. 2e and FIG. 3d, such embodiments comprise an action 241 where the NE 107 transmits to the ADMF 108 via the X1 interface, a response 341 comprising one bulk of information from said information pertaining to LI tasks and comprising a confirmation that a last bulk of information from said information pertaining to LI tasks has been transmitted.

As will be described below and further illustrating the effects and advantages of these embodiments, the transmitting in action 201 of a request 301 by the ADMF 108 to the NE 107 via the X1 interface may comprise transmitting any of a GetAllDetailsRequest message and a ListAllDetailsRequest message as specified in technical specification (TS) 103 221-1 V1.8.1 by ETSI. Similarly, any transmitting in actions 211, 221, 231 and 241 of a response 303, 321, 331 and 341 by the NE 107 to the ADMF 108 via the X1 interface may comprise transmitting any of a GetAllDetailsResponse message and a ListAllDetailsResponse message as specified in TS 103 221-1 V1.8.1 by the ETSI. Similarly, any transmitting in actions 213, 215, 233 and 235 of a request 305, 309, 333 and 337 by the NE 107 to the ADMF 108 via the X1 interface may comprise transmitting a BulkAllDetailsRequest message as specified in TS 103 221-1 V1.8.1 by the ETSI.

Specifically, with regard to such additions to TS 103 221-1 V1.8.1, the GetAllDetailsRequest and ListAllDetailsRequest messages may be provided three new optional fields for bulk handling of information pertaining to LI tasks that the NE 107 is handling. A corresponding new optional field in GetAllDetailsResponse and ListAllDetailsResponse messages that the NE 107 transmits to the ADMF 108 is also provided. Also, a new message, for example denoted BulkAllDetails, transmitted by the NE 107 to the ADMF 108 is added to TS 103 221-1 V1.8.1.

For example, TS 103 221-1 V1.8.1 may be completed by addition of three new fields in Table 30 "GetAllDetailsRequest" in clause 6.4.5.1 and in Table 32 "ListAllDetailsRequest" in clause 6.4.6.1 in TS 103 221-1 V1.8.1 as shown herein in table 1.

The NE 107 should operate according to prior art also in case the field UseBulk is present with the third value DoNotUseBulk.

In case the UseBulk field in a GetAllDetailsRequest or ListAllDetailsRequest message is present with the first or second values, i.e. MustUseBulk or CanUseBulk, then also the fields BulkSize and RequestId may be in the message transmitted by the ADMF 108 in action 201. BulkSize indicates the maximum amount of data that can be inserted in a single bulk message. If BulkSize is not present, it may mean that the ADMF 108 can handle bulk messages of any data; in such a case the NE 107 may decide whether or not data shall be transmitted in one or more bulk messages. The RequestId is the identifier that the NE 107 returns to the ADMF 108 in subsequent bulk messages.

Figure 3E:
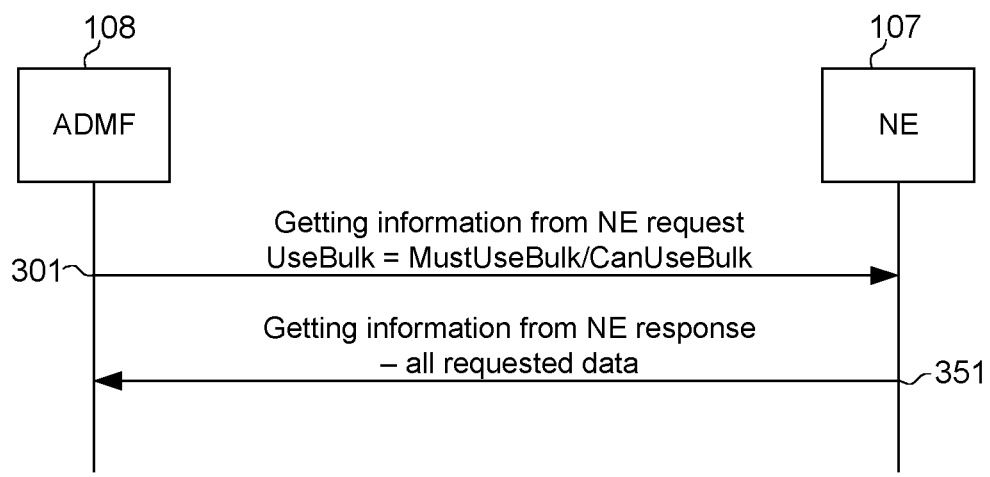

From a point of view of the NE 107, at reception of a GetAllDetailsRequest or ListAllDetailsRequest message the NE 107, if it is not configured to support the additions to TS 103 221-1 V1.8.1 described herein, the NE 107 does not read the additional field UseBulk and, consequently, the NE 107 operates according to prior art and transmits a response 351 as illustrated in FIG. 3e. The same applies if the NE 107 is configured to support the new additions to TS 103 221-1 V1.8.1 described herein but the UseBulk field is missing or present with value DoNotUseBulk.

In case the GetAllDetailsRequest or ListAllDetailsRequest message contains UseBulk field with a MustUseBulk value, the NE 107 must immediately respond to the ADMF

TABLE 1

| Field | Description | Format | M/C/O |
|---|---|---|---|
| UseBulk | Statement of whether use of bulk is requested or not. If this field is not present, bulk messages must not be used | Enumerated value - one of: "MustUseBulk", "CanUseBulk", and "DoNotUseBulk" | O |
| BulkSize | Maximum size in kilobytes of data to insert in a single bulk message | integer | O |
| RequestId | Uniquely identifies the Request. | UUIDv4 | C |

In table 1, as well as in other tables herein, "M/C/O" is an abbreviation for "Mandatory/Conditional/Optional" and the format UUIDv4 refers to the version 4 universally unique identifier (UUID) as defined in Internet engineering task force (IETF) request for comments (RFC) 4122. The content of the UseBulk field is the bulk indicator included in the request as discussed above in connection with action 201. As such, the first value of the bulk indicator is "MustUseBulk", the second value is "CanUseBulk" and the third value is "DoNotUseBulk".

In case the UseBulk field is not present in the GetAllDetailsRequest or ListAllDetailsRequest (which would be the case if the ADMF 108 does not support the additions as described herein), it means that the ADMF 108 does not handle transmission in bulks as described, which in turn means that the NE 107 must operate according to prior art.

108, without inserting any data in the response message. All data, i.e. the requested information pertaining to LI tasks, will be included in one or more bulk messages as described in some detail herein. If instead the GetAllDetailsRequest or ListAllDetailsRequest message contains a UseBulk field with a CanUseBulk value, the NE 107 may decide if it is to start inserting data in the response message or immediately answer to the ADMF 108, without inserting any data in the response message. If data are inserted in the response message, the NE 107 must not exceed the BulkSize and to send the answer within the TIME1 period.

With regard to the response transmitted by the NE 107 to a GetAllDetailsRequest message, TS 103 221-1 V1.8.1 may be completed by addition of a new optional field in Table 31 GetAllDetailsResponse in clause 6.4.5.1 in TS 103 221-1 V1.8.1 as shown herein in table 2.

TABLE 2

| Field | Description | Format | M/C/O |
|---|---|---|---|
| RequestStatus | Statement of how the request is handled, all in the response message, partially in response message, all in following bulk messages. | Enumerated value - one of "Completed", "Ongoing", and "DoneWithBulk" | O |

TABLE 2-continued

| Field | Description | Format | M/C/O |
|---|---|---|---|
| | If This field is not present the request is handled all in the response message. | | |
| NEStatusDetails | ... | ... | C |
| ListOfTaskResponseDetails | ... | ... | C |
| ListOfDestinationResponseDetails | ... | ... | C |

The already existing fields NEStatusDetails, ListOfTaskResponseDetails, and ListOfDestinationResponseDetails change from M (Mandatory) to C (Conditional).

Similarly, with regard to the response transmitted by the NE 107 to a ListAllDetailsRequest message, TS 103 221-1 V1.8.1 may be completed by addition of a new optional field in Table 33 ListAllDetailsResponse in clause 6.4.6.1 in TS 103 221-1 V1.8.1 as shown herein in table 3.

TABLE 3

| Field | Description | Format | M/C/O |
|---|---|---|---|
| RequestStatus | Statement of how the request is handled, all in the response message, partially in response message, all in following bulk messages. If This field is not present the request is handled all in the response message. | Enumerated value - one of "Completed", "Ongoing", and "DoneWithBulk" | O |
| ListOfXIDs | ... | ... | C |
| ListOfDIDs | ... | ... | C |

The already existing fields ListOfXIDs and ListOfDIDs change from M (Mandatory) to C (Conditional).

In case the NE 107 is not configured to support the additions to TS 103 221-1 V1.8.1 as described herein, the added RequestStatus field is not present in the response transmitted by the NE 107, and the message is handled according to prior art. The ADMF 108 must then consider that the RequestStatus field has a value of Completed.

With regard to the added message, herein named BulkAllDetails, it has a direction such that it is transmitted by the NE 107 to the ADMF 108 and it is used to provide all or part of the data requested by the ADMF 108 with GetAllDetails and ListAllDetails messages.

The BulkAllDetailsRequest message, transmitted by the NE 107 to the ADMF 108, comprises the fields of table 4 herein. Three fields (NEStatusDetails, ListOfTaskResponseDetails and ListOfDestinationResponseDetails) are inherited from the GetAllDetailsResponse message and two fields (ListOfXIDs and ListOfDIDs) are inherited from the ListAllDetailsResponse message, both of which are discussed above.

TABLE 4

| Field | Description | Format | M/C/O |
|---|---|---|---|
| RequestStatus | Statement of how the request is handled, completed in this message or other bulk messages will follow. | Enumerated value - one of "Completed" and "Ongoing" | M |
| MessageSequence | Number order of the message response | Integer | M |
| RequestId | Uniquely identifies the Request. | UUIDv4 | M |
| RequestMessageType | Indicates the type of Request Message that the BulkAllDetails message is a response to | One of the following: "GetAllDetails", "ListAllDetails" | M |
| NEStatusDetails | ... | ... | O |
| ListOfTaskResponseDetails | ... | ... | O |
| ListOfDestinationResponseDetails | ... | ... | O |
| ListOfXIDs | ... | ... | O |
| ListOfDIDs | ... | ... | O |

A response message, transmitted by the ADMF 108 to the NE 107, may be named BulkAllDetailsResponse and comprising the field according to table 5 herein.

TABLE 5

| Field | Description | Format | M/C/O |
|---|---|---|---|
| OK or Error | The general errors with error codes in clause 6.7 of TS 103 221-1 V1.8.1 apply | See clause 6.7 of TS 103 221-1 V1.8.1 | M |

The NE 107 inserts, in the BulkAllDetailsRequest message transmitted to the ADMF 108, data according to the BulkSize requested by the ADMF 108 in the request transmitted in action 210. During the insertion of data, when the amount of data reaches an amount corresponding to the value of BulkSize, the bulk message (i.e. the message named herein BulkAllDetailsRequest) is transmitted to the ADMF 108. As illustrated in table 4 herein, in the BulkAllDetailsRequest message information is also inserted regarding the RequestId message, the number of the Bulk message (i.e. MessageSequence having values 1, 2 and so on), the type of messages (i.e. GetAllDetails or ListAllDetails) that initially requested the bulk and an indication if this is the last message, i.e. Completed meaning that all data has been inserted or that other messages will follow as indicated by Ongoing.

The ADMF 108, having received a BulkAllDetailsRequest message, checks the sequence number (MessageSequence) and the RequestId with RequestMessageType in order to verify whether or not the received BulkAllDetailsRequest message is expected and that no message has been lost. After that, the ADMF 108 transmits to the NE 107 a BulkAllDetailsResponse message and starts handling the received data. If the RequestStatus of the received BulkAllDetailsRequest has the value Ongoing, the ADMF 108 determines that further BulkAllDetailsRequest messages will arrive with the same RequestId.

Figure 4:
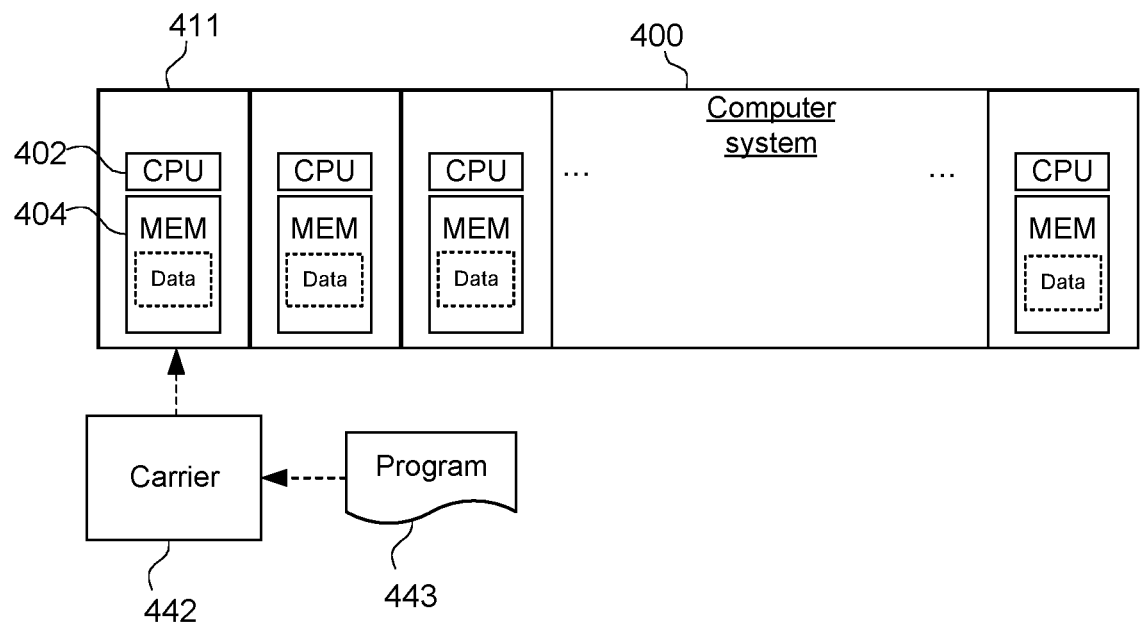

Turning now to FIG. 4, and with continued reference to FIGS. 1-3, a computer system 400 will be described in some detail. The computer system 400, which may correspond to at least part of the telecommunication network 100, comprises at least a processor 402 and a memory 404. The memory 404 contains instructions executable by the processor 402 whereby the computer system 400 is operative to:

- transmit, by an ADMF 108 to a NE 107 via an X1 interface, a request 301 for information pertaining to LI tasks that are associated with the NE 107, said request comprising a bulk indicator that indicates a procedure of transmission, from the NE 107 to the ADMF 108, of said information pertaining to LI tasks,
- determine, by the NE 107 based at least on the bulk indicator, whether or not transmission of said information pertaining to LI tasks is to be performed using the procedure of transmission indicated by the bulk indicator and, if it is determined that transmission of said information pertaining to LI tasks is to be performed using the procedure of transmission indicated by the bulk indicator,
- transmit, by the NE 107 to the ADMF 108 via the X1 interface using the procedure of transmission indicated by the bulk indicator, said information pertaining to LI tasks.

In some embodiments, the computer system 400 comprises one or more compute hosts 411, said one or more compute hosts 411 comprising at least a processor 402 and a memory 404.

The instructions that are executable by the processor 402 may be software in the form of a computer program 443. The computer program 443 may be contained in or by a carrier 442, which may provide the computer program 443 to the memory 404 and processor 402. The carrier 442 may be in any suitable form including an electronic signal, an optical signal, a radio signal or a computer readable storage medium.

In some embodiments, the computer system 400 is operative such that the bulk indicator indicates that the information pertaining to LI tasks is to be kept in one bulk or split into several bulks of information for transmission by the NE 107 to the ADMF 108 via the X1 interface using a corresponding one or several transmissions.

In some embodiments, the computer system 400 is operative such that the bulk indicator has a first value and the determining by the NE 107 comprises determining that said information pertaining to LI tasks is to be kept in one bulk or split into several bulks of information for transmission by the NE 107.

In some embodiments, the computer system 400 is operative to determine, by the NE 107, a number of bulks of information for transmission of said information pertaining to LI tasks, and wherein the computer system 400 is operative such that the transmitting by the NE 107 to the ADMF 108 via the X1 interface comprises:

- transmitting a response 303 comprising a confirmation that subsequent transmissions will comprise a respective bulk of information from said information pertaining to LI tasks,
- transmitting zero or more requests 305 comprising a respective bulk of information from said information pertaining to LI tasks and comprising a confirmation that at least one further bulk of information from said information pertaining to LI tasks will be transmitted, and
- transmitting a request 309 comprising a last bulk of information from said information pertaining to LI tasks and comprising a confirmation that a last bulk of information from said information pertaining to LI tasks has been transmitted.

In some embodiments, the computer system 400 is operative such that the transmitting of a request 301 by the ADMF 108 to the NE 107 via the X1 interface comprises transmitting information specifying a maximum bulk size of a bulk of information for transmission from the NE 107 to the ADMF 108, and operative such that any transmitting of a request 305, 309 by the NE 107 to the ADMF 108 via the X1 interface comprising a bulk of information from said information pertaining to LI tasks comprises transmitting each respective bulk of information using a bulk size that is less than or equal to said maximum bulk size.

In some embodiments, the computer system 400 is operative such that the transmitting of a request 301 by the ADMF 108 to the NE 107 via the X1 interface comprises transmitting information identifying the request transmitted by the ADMF 108, and operative such that any transmitting of a request 305, 309 by the NE 107 to the ADMF 108 via the X1 interface comprising a bulk of information from said information pertaining to LI tasks comprises transmitting the information identifying the request 301 transmitted from the ADMF 108.

In some embodiments, the computer system 400 is operative such that the bulk indicator has a second value and the determining by the NE 107 comprises determining that said information pertaining to LI tasks is to be kept in one bulk or split into several bulks of information for transmission by the NE 107.

In some embodiments, the computer system 400 is operative to determine, by the NE 107, that a number of bulks of information for transmission of said information pertaining to LI tasks is one, and operative such that the transmitting by the NE 107 to the ADMF 108 via the X1 interface comprises transmitting a response 321 comprising one bulk of information from said information pertaining to LI tasks and comprising a confirmation that a last bulk of information from said information pertaining to LI tasks has been transmitted.

In some embodiments, the computer system 400 is operative such that the transmitting of a request 301 by the ADMF 108 to the NE 107 via the X1 interface comprises transmitting information specifying a maximum bulk size of a bulk of information for transmission from the NE 107 to the ADMF 108, and operative such that the transmitting of a response 321 by the NE 107 to the ADMF 108 via the X1 interface comprising a bulk of information from said information pertaining to LI tasks comprises transmitting the one bulk of information using a bulk size that is less than or equal to said maximum bulk size.

In some embodiments, the computer system 400 is operative to determine, by the NE 107, a number of bulks of information for transmission of said information pertaining to LI tasks, and wherein the computer system 400 is operative such that the transmitting by the NE 107 to the ADMF 108 via the X1 interface comprises:

transmitting a response 331 comprising a first bulk of information from said information pertaining to LI tasks and comprising a confirmation that at least one further bulk of information from said information pertaining to LI tasks will be transmitted, transmitting zero or more requests 333 comprising a respective bulk of information from said information pertaining to LI tasks and comprising a confirmation that at least one further bulk of information from said information pertaining to LI tasks will be transmitted, and transmitting a request 337 comprising a last bulk of information from said information pertaining to LI tasks and comprising a confirmation that a last bulk of information from said information pertaining to LI tasks has been transmitted.

In some embodiments, the computer system 400 is operative such that the transmitting of a request 301 by the ADMF 108 to the NE 107 via the X1 interface comprises transmitting information specifying a maximum bulk size of a bulk of information for transmission from the NE 107 to the ADMF 108, and operative such that the transmitting of a response 331 by the NE 107 to the ADMF 108 via the X1 interface comprising a first bulk of information from said information pertaining to LI tasks comprises transmitting the first bulk of information using a bulk size that is less than or equal to said maximum bulk size, and operative such that any transmitting of a request 333 by the NE 107 to the ADMF 108 via the X1 interface comprising a bulk of information from said information pertaining to LI tasks comprises transmitting each respective bulk of information using a bulk size that is less than or equal to said maximum bulk size.

In some embodiments, the computer system 400 is operative such that the transmitting of a request 301 by the ADMF 108 to the NE 107 via the X1 interface comprises transmitting information identifying the request transmitted by the ADMF 108, and operative such that the transmitting of a response 331 by the NE 107 to the ADMF 108 via the X1 interface comprising a first bulk of information from said information pertaining to LI tasks comprises transmitting the information identifying the request transmitted from the ADMF 108, and operative such that any transmitting of a request 333 by the NE 107 to the ADMF 108 via the X1 interface of a bulk of information from said information pertaining to LI tasks comprises transmitting the information identifying the request transmitted from the ADMF 108.

In some embodiments, the computer system 400 is operative such that the bulk indicator has a third value, and operative such that the determining by the NE 107 comprises determining that said information pertaining to LI tasks is to be kept in one bulk of information for transmission by the NE 107, and wherein the computer system 400 is operative to transmit, by the NE 107 to the ADMF 108 via the X1 interface, a response 341 comprising one bulk of information from said information pertaining to LI tasks and comprising a confirmation that a last bulk of information from said information pertaining to LI tasks has been transmitted.

In some embodiments, the computer system 400 is operative such that the transmitting of a request 301 by the ADMF 108 to the NE 107 via the X1 interface comprises transmitting any of a GetAllDetailsRequest message and a ListAllDetailsRequest message as specified in technical specification 103 221-1 V1.8.1 by the European Telecommunications Standards Institute, ETSI.

In some embodiments, the computer system 400 is operative such that any transmitting of a response 303, 321, 331, 341 by the NE 107 to the ADMF 108 via the X1 interface comprises transmitting any of a GetAllDetailsResponse message and a ListAllDetailsResponse message as specified in technical specification 103 221-1 V1.8.1 by the ETSI.

In some embodiments, the computer system 400 is operative such that any transmitting of a request 305, 309, 333, 337 by the NE 107 to the ADMF 108 via the X1 interface comprises transmitting a BulkAllDetailsRequest message as specified in technical specification 103 221-1 V1.8.1 by the ETSI.

Figure 5:
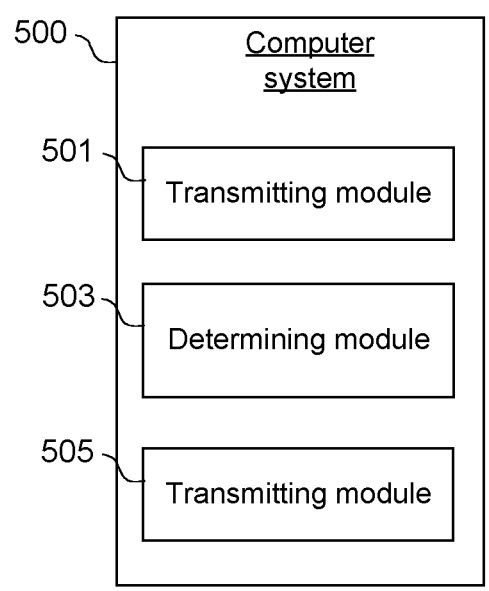

Turning now to FIG. 5, and with continued reference to FIGS. 1 to 4, a computer system 500 will be described in some detail. The computer system 500 comprises:

a transmitting module 501 configured to transmit, by an ADMF 108 to a NE 107 via an X1 interface, a request 301 for information pertaining to LI tasks that are associated with the NE 107, said request comprising a bulk indicator that indicates a procedure of transmission, from the NE 107 to the ADMF 108, of said information pertaining to LI tasks, a determining module 503 configured to determine, by the NE 107 based at least on the bulk indicator, whether or not transmission of said information pertaining to LI tasks is to be performed using the procedure of transmission indicated by the bulk indicator and, if it is determined that transmission of said information pertaining to LI tasks is to be performed using the procedure of transmission indicated by the bulk indicator, a transmitting module 505 configured to transmit, by the NE 107 to the ADMF 108 via the X1 interface using the procedure of transmission indicated by the bulk indicator, said information pertaining to LI tasks.

The computer system 500 may comprise further modules that are configured to perform in a similar manner as, e.g., a computer system 400 described above in connection with FIG. 4.

The invention claimed is:

1. A method performed by a network element (NE), the method comprising:

receiving, from a lawful interception (LI) administrative function (ADMF), a request for LI information pertaining to LI tasks that are associated with the NE, wherein the request comprises a bulk indicator that indicates whether the NE must transmit to the ADMF a single message responsive to the request for the LI information;

determining, based at least on the bulk indicator, whether or not the NE must transmit to the ADMF a single message responsive to the request for the LI information; and if it is determined that the NE must transmit to the ADMF a single message responsive to the request for the LI information, transmitting a single message to the ADMF, otherwise transmitting to the ADMF one or more messages where each of the one or more messages is responsive to the request for the LI information, wherein the bulk indicator indicates that the NE must transmit to the ADMF at least a first message responsive to the request for the LI information and a second message responsive to the request for the LI information, or the bulk indicator indicates that the NE may transmit to the ADMF more than one message that is responsive to the request for the LI information.

2. A non-transitory computer readable storage medium storing a computer program comprising instructions which, when executed on at least one processor in a computer system, causes the computer system to perform the method of claim 1.

3. A network element (NE) comprising:
a receiver for receiving, from a lawful interception (LI) administrative function (ADMF), a request for LI information pertaining to LI tasks that are associated with the NE, wherein the request comprises a bulk indicator that indicates whether the NE must transmit to the ADMF a single message responsive to the request for the LI information;
processing circuitry; and
memory containing instructions executable by the processing circuitry, wherein the NE is configured to perform a method comprising:
determining, based at least on the bulk indicator, whether or not the NE must transmit to the ADMF a single message responsive to the request for the LI information; and
if it is determined that the NE must transmit to the ADMF a single message responsive to the request for the LI information, transmitting a single message to the ADMF, otherwise transmitting to the ADMF one or more messages where each of the one or more messages is responsive to the request for the LI information, wherein
the bulk indicator indicates that the NE must transmit to the ADMF at least a first message responsive to the request for the LI information and a second message responsive to the request for the LI information, or
the bulk indicator indicates that the NE may transmit to the ADMF more than one message that is responsive to the request for the LI information.

4. The NE of claim 3, wherein
in response to determining that the bulk indicator is set to a particular value, the NE is configured to transmit to the ADMF at least: i) a first message responsive to the request for the LI information and ii) a second message responsive to the request for the LI information,
the first message responsive to the request for the LI information does not include any of the requested LI information, and
the second message responsive to the request for the LI information includes at least some of the requested LI information.

5. The NE of claim 4, wherein
the second message responsive to the request for the LI information further includes a status indicator indicating that either: i) the second message includes all of the requested LI information or ii) the second message does not include all of the requested LI information.

6. The NE of claim 5, wherein
the request for the LI information comprises a request identifier,
the first message responsive to the request for the LI information includes the request identifier, and
the second message responsive to the request for the LI information includes the request identifier.

7. The NE of claim 3, wherein
in response to determining that the bulk indicator is set to a particular value, the NE is configured to transmit to the ADMF at least a first message responsive to the request for the LI information, and
the first message responsive to the request for the LI information includes at least some of the requested LI information.

8. The NE of claim 7, wherein
the first message responsive to the request for the LI information further includes a status indicator indicating that either: i) the first message includes all of the requested LI information or ii) the first message does not include all of the requested LI information.

9. The NE of claim 8, wherein
the first message responsive to the request for the LI information further includes a status indicator indicating that the first message does not include all of the requested LI information,
the NE is further configured to transmit to the ADMF a second message responsive to the request for the LI information,
the second message responsive to the request for the LI information includes at least some of the requested LI information, and
the second message responsive to the request for the LI information further includes a status indicator indicating that either: i) no further messages responsive to the request for the LI information or ii) at least one further message responsive to the request for the LI information will be sent.

10. The NE of claim 9, wherein
the request for the LI information comprises a request identifier,
the first message responsive to the request for the LI information includes the request identifier, and
the second message responsive to the request for the LI information includes the request identifier.

11. The NE of claim 3, wherein
in response to determining that the bulk indicator is set to a particular value, the NE is configured to transmit to the ADMF a message that includes all of the requested LI information.

12. The NE of claim 3, wherein
the request includes a message size indicator indicating a maximum allowed message size.

* * * * *